US005720106A

United States Patent [19]
Serksnis et al.

[11] Patent Number: 5,720,106
[45] Date of Patent: Feb. 24, 1998

[54] HEIGHT DETERMINING SYSTEM FOR AUTOMATIC GPS RECEIVER

[75] Inventors: Anthony W. Serksnis, San Jose; Mark E. Nichols, Sunnyvale, both of Calif.

[73] Assignee: Trimble Navigation Limited, Sunnyvale, Calif.

[21] Appl. No.: 630,420

[22] Filed: Apr. 2, 1996

[51] Int. Cl.⁶ ........................................................ G01B 3/10
[52] U.S. Cl. ............................ 33/759; 33/758; 33/760; 33/768; 33/770; 33/668; 33/394
[58] Field of Search ............................ 33/759, 1 E, 758, 33/760, 761, 766, 767, 768, 769, 770, 755, 666, 668, 392, 393, 394, 281, 282, 283, 285, 286, 29 D, 291, 292

[56] References Cited

U.S. PATENT DOCUMENTS

| | | | |
|---|---|---|---|
| 2,656,606 | 10/1953 | Porter | 33/281 |
| 3,016,617 | 1/1962 | Bricker | 33/759 |
| 3,064,356 | 11/1962 | Kruse | 33/394 |
| 3,172,205 | 3/1965 | Gammon | 33/394 |
| 3,354,549 | 11/1967 | Fisher | 33/666 |
| 4,691,444 | 9/1987 | Capps | 33/290 |
| 4,888,881 | 12/1989 | Dudley | 33/759 |
| 5,159,760 | 11/1992 | Spiegel et al. | 33/227 |
| 5,414,942 | 5/1995 | Moore et al. | 33/666 |

*Primary Examiner*—Christopher W. Fulton
*Attorney, Agent, or Firm*—Patrick T. King

[57] ABSTRACT

A tape measurement apparatus is provided for measuring the slope height of a GPS surveying system receiver, with an integral antenna, which is vertically suspended over a ground mark. A tape mounting hook is provided for securing the distal end of a tape measure in a location which is known precisely with respect to the phase center of the GPS receiver. The tape measure housing has a pointer arm of precisely known length which extends out from the tape measure housing in a direction opposite and parallel to the normalized line of extension of the tape from the housing. A distance scale imprinted on the tape compensates for the combined lengths of the housing and pointer arm so that a user can read the uncorrected slope height of the GPS receiver directly from the scale while applying the tip of the pointer arm to the ground mark.

3 Claims, 4 Drawing Sheets

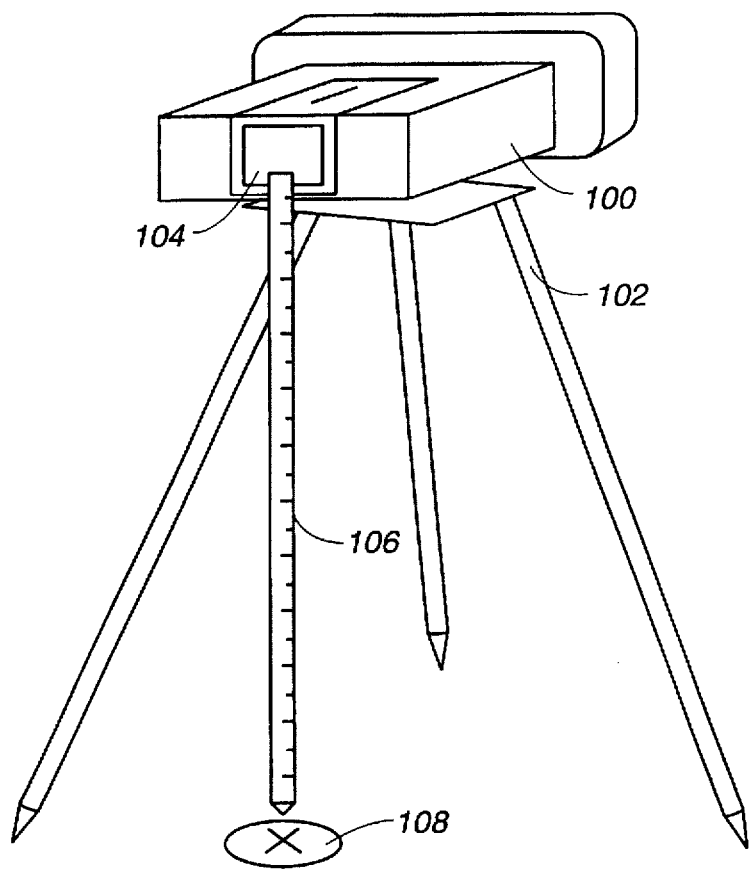
FIG._1
(PRIOR ART)

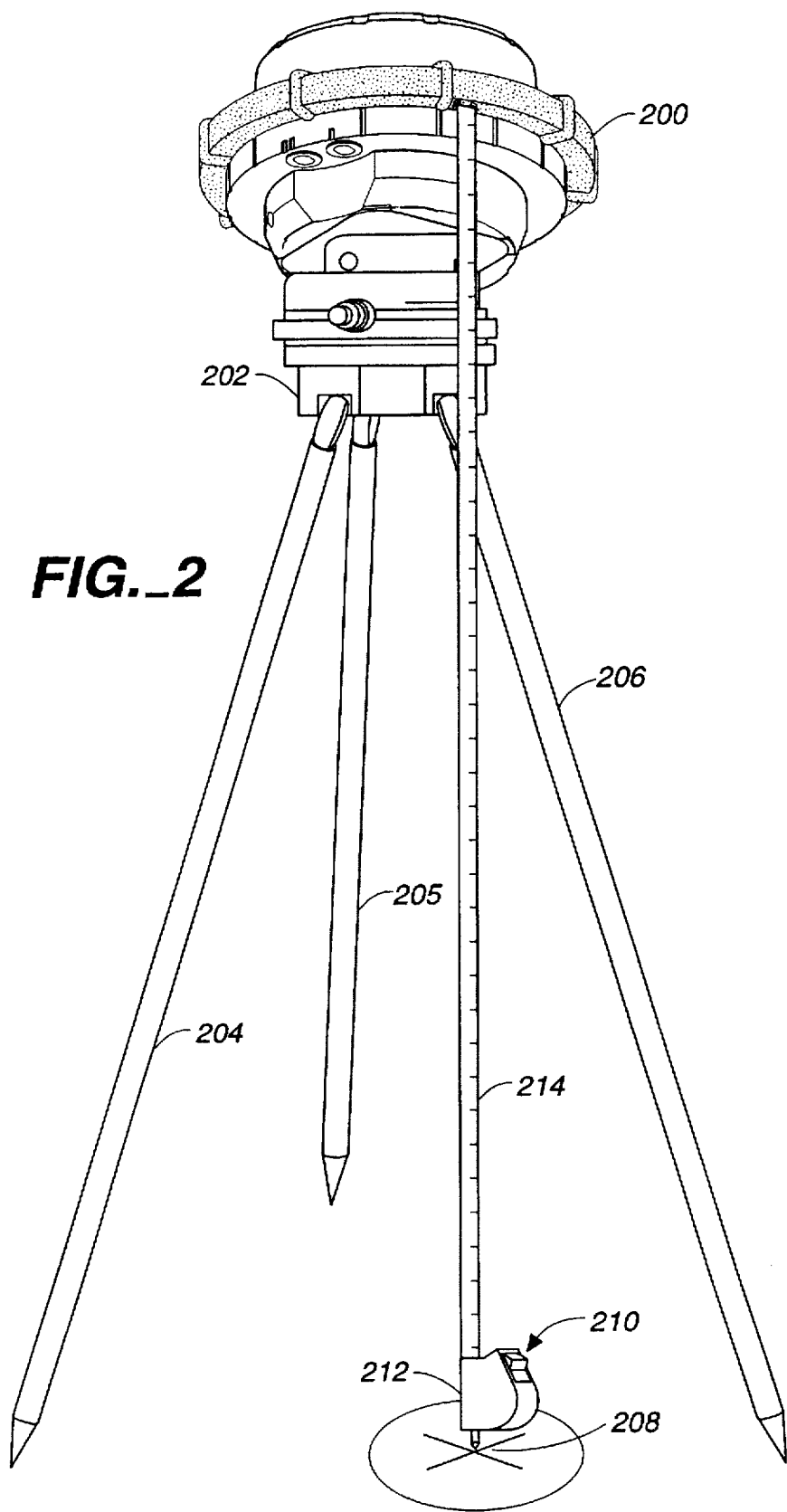
FIG._2

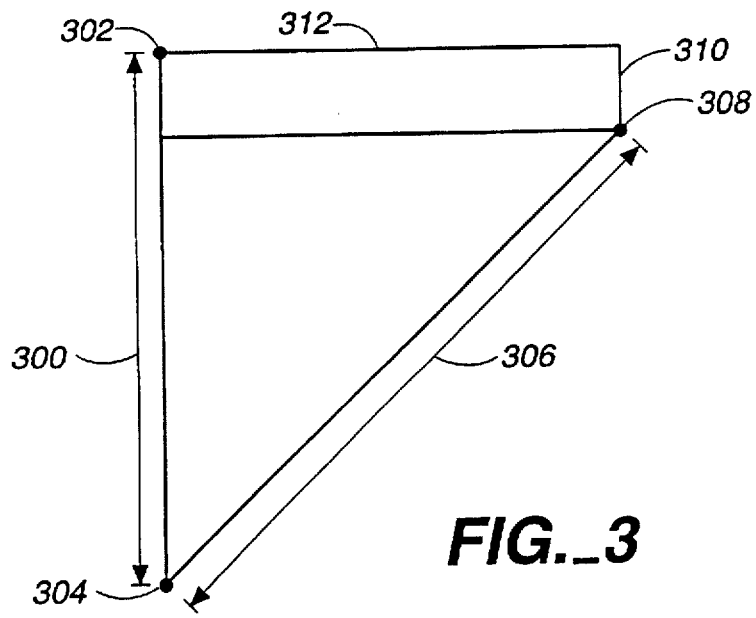
FIG._3
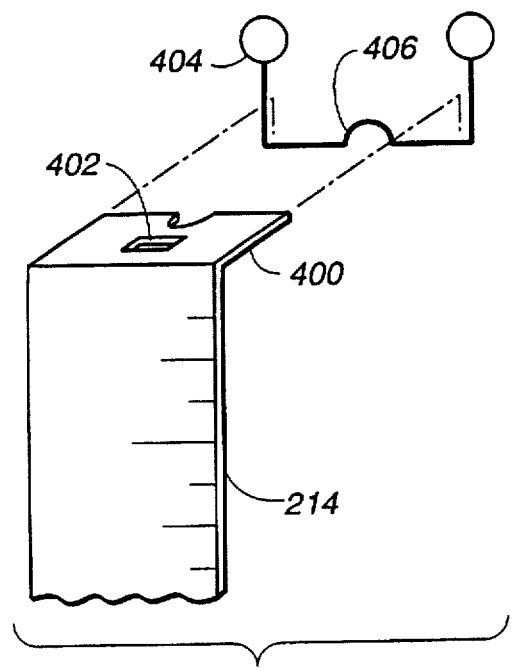
FIG._4

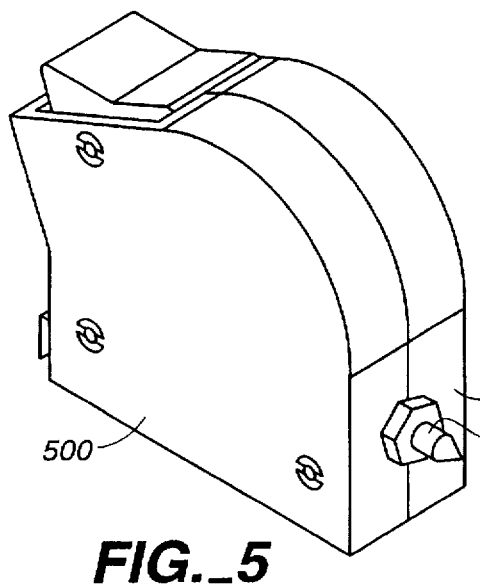
FIG._5
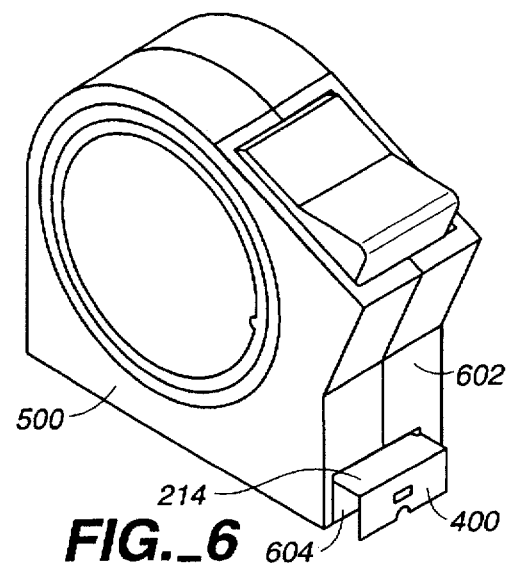
FIG._6
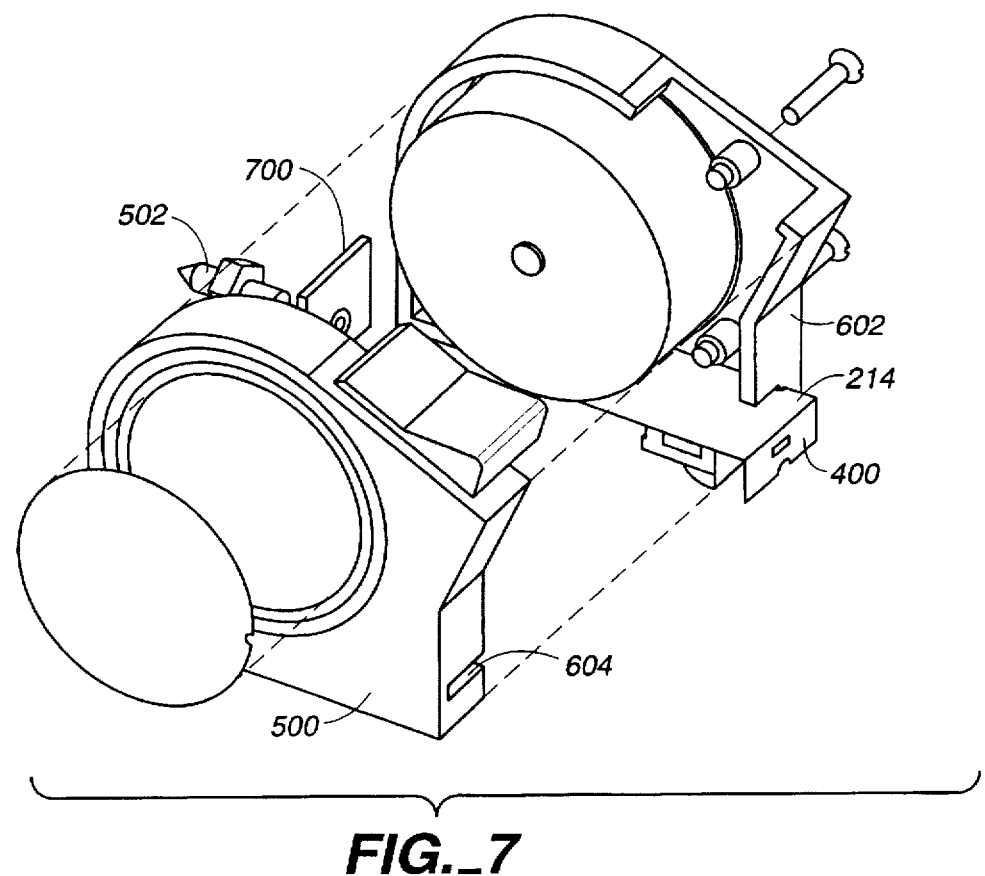
FIG._7

5,720,106

HEIGHT DETERMINING SYSTEM FOR AUTOMATIC GPS RECEIVER

BACKGROUND OF THE INVENTION

1. Field of the Invention

This invention relates to surveying instruments which use a global positioning system (GPS) and, more particularly, to apparatus for providing a height measurement of a GPS receiver above a ground reference mark.

2. Prior Art

GPS receivers are widely used in surveying applications. The type of GPS equipment which is used in conjunction with the instant invention includes an antenna and an integral GPS receiver/signal processor. The antenna and the integral GPS receiver/signal processor are mounted on a tripod for use in the field.

Surveying applications require precise determination of the exact location of a point being surveyed. For surveying applications, not only are horizontal x, y components needed, but an altitude component is also needed. Because of the physical packaging constraints required for an antenna and an integral GPS receiver/signal processor, the exact point of reception of the GPS signals at the antenna, called the phase center of the GPS antenna, is known only indirectly. Exact location of the phase center requires that the antenna and integral GPS receiver/signal processor be calibrated with respect to the height of the phase center above a ground reference mark located at the base of the tripod which supports the antenna and integral GPS receiver/signal processor.

In a surveying operation which uses GPS, it is therefore often necessary to determine the exact height of the phase center of a GPS antenna above a given surface. Since GPS surveying systems are capable of determining location points within error margins of less than one centimeter, the GPS surveying system, for which the instant invention was designed, requires an accurate calibration procedure. This calibration procedure requires an accurate measurement of the height of the phase center of the GPS antenna above the ground mark over which the GPS antenna is centered.

Since the phase center of the GPS receiver antenna is physically inaccessible within, for example, an antenna radome, an operator is required to measure the value of what is called the uncorrected slope distance, which is the distance from the ground mark to a predetermined reference point on the side of the receiver housing. For a given GPS surveying system, the distance of the phase center from the reference point on the side of the receiver housing and the orientation of the antenna phase center with respect to that reference point are known.

To find the actual height of the antenna phase center above the ground mark, the value of the uncorrected slope height is entered into a GPS receiver control unit. The GPS receiver control unit is programmed to calculate the actual height of the phase center of the GPS receiver antenna above the ground mark. The calculations are based on known geometric relationships between the phase center of the GPS receiver antenna, the ground mark, and the predetermined reference point on the side of the receiver housing.

Measuring the uncorrected slope height of the phase center of a GPS receiver antenna is generally accomplished by manual use of either a fixed length rod or a standard tape measure. However, measurements with this type of equipment have problems of inconvenience to a user and measurement inaccuracies. Non-retractable fixed length rods are cumbersome to store and transport in the field. Standard tape measures used in the prior art are cumbersome to use and also have measurement scales which do not compensate for the length of the housing into which a measuring tape is coiled. It has been found that without scale compensation for the length of a standard tape-measure housing, reading errors can easily occur while a user is applying the cumbersome housing or tape to the ground position.

SUMMARY OF THE INVENTION

Apparatus for measuring the uncorrected slope height of a GPS receiver antenna over a ground mark is provided according to the invention.

The apparatus according to the invention includes a tape mounting hook which is typically fixed to a housing for an integral GPS receiver/signal processor in a reference position near the phase center of the GPS receiver. The position of the tape mounting hook is precisely known with respect to the phase center of the receiver. A retractable tape measure assembly is also provided. The distal end of the tape is provided with a slot which is coupled to the tape mounting hook to secure the distal end of the tape while making a measurement of the housing. The measurement tape contained in the housing is extended out of the housing in a direction normal to the second surface of the housing and generally parallel with the pointer arm on the opposite side.

The tape measure housing is provided with a fixed length pointer arm which extends away from a first surface of the tape measure housing. The tape measure housing has a second surface, which is on the other side of the housing. An opening is provided in the second surface of the housing. The measurement tape is provided with a distance scale imprinted thereon. The distance scale is calibrated to compensate precisely for the known lengths of the housing and pointer arm. When an operator positions the tip of the housing pointer arm at the ground mark, the uncorrected slope height is determined by direct reading of the point on the scale which is next to the edge of the second surface of the housing.

The instant invention provides increased convenience and precision since the user need only attach the free end of the measurement tape to the tape mounting hook on the housing, apply the pointer arm of the housing to the ground mark, and read the automatically compensated distance value of the slope height of the GPS receiver from the compensated distance scale on the measuring tape.

Further features and advantages of the present invention will become apparent from the detailed description of preferred embodiments appearing below.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a perspective view of a prior art technique for measuring the uncorrected slope height of a GPS antenna and receiver/processor mounted on a tripod.

FIG. 2 is a perspective view of a GPS antenna and a receiver/processor mounted on a tripod, along with a measuring tape for measuring uncorrected slope height according to the invention.

FIG. 3 is a diagram illustrating the geometrical relationships between the phase center of a GPS antenna, a ground reference point, the slope height of the GPS receiver above the ground reference point, and the actual height of the GPS receiver above the ground reference point.

FIG. 4 is an enlarged, detailed perspective view of a tape mounting hook which is mounted to a GPS receiver housing and which is adapted to engage a clip on the distal end of a measuring tape.

FIG. 5 is a perspective view of a tape housing assembly showing a fixed length pointer arm which extends away from a first surface of the tape measure housing.

FIG. 6 is a perspective view of a tape housing assembly showing the distal end of a measurement tape extending out of a slot in the tape measure housing.

FIG. 7 is an exploded, perspective view of the tape housing assembly according to the invention.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1 illustrates a prior art technique for measuring the uncorrected slope height of a GPS antenna and receiver/processor unit 100 mounted on a tripod 102. A tape measuring housing 104 is fixed to the rear panel of the unit 100. A measuring tape 106 is pulled out of the housing by an operator. The operator bends over and reaches down to hold the free end of the measuring tape 106 next to the ground reference point 108. The operator then looks up and notes the scale value on the measuring tape at the tape measuring housing on the receiver/processor unit 100. It should be apparent that holding the free end to the ground reference point and reading the scale value up on the tape housing is awkward and may produce significant measurement inaccuracies.

FIG. 2 shows an integral GPS antenna and receiver/processor unit 200 mounted on a tripod 202. The tripod has legs 204, 205, 206 which are positioned and adjusted in length to position the unit 200 over a ground reference mark 208. A measuring tape assembly 210 according to the invention is provided for measuring uncorrected slope height of the unit 200 with respect to the ground reference mark 208. The measuring tape assembly 210 includes a housing 212 containing a retractable measurement tape 214 with its free end connected to a predetermined reference point on the unit 200.

FIG. 3 is a diagram which illustrates the geometrical relationships involved in determining the true height distance 300 of the phase center 302 of a GPS antenna above a ground reference mark, or point, 304. The slope height distance 306 is measured by an operator between the ground reference mark 304 and a predetermined reference point 308 on a GPS receiver to which the GPS antenna is mounted. For a particular GPS antenna/receiver combination, the fixed vertical distance 310 of the phase center 302 above the reference point 308 is known and the fixed horizontal distance 312 of the phase reference center 302 from the reference point 308 is also known. Using geometrical relationships between the various fixed and variable distances, the true height distance 300 of the phase center 302 of the GPS antenna above the ground reference mark 304 can be determined.

FIG. 4 shows an a tape mounting hook which is mounted to a GPS receiver housing and which is adapted to engage a clip on the distal end of a measuring tape.

FIG. 4 shows a tape mounting hook 400 with a slot 402 formed therein fixed to the free, distal end of the measuring tape 214 of FIG. 2. A wire hook 404 is provided with a raised lip portion 406 which is adapted to be engaged by the slot 402 on the distal end of the tape measure 204 for holding the distal end of the tape measure 204 in place while measuring the uncorrected slope height of the GPS receiver above a ground reference mark. The tape mounting hook 404 is placed at a predetermined reference point on the side of the housing of a GPS receiver unit 200 of FIG. 1.

FIG. 5 shows a tape measure housing 500 of the measuring tape assembly 210 of FIG. 1 with a pointer arm 502 extending from a first surface, or side, 504 of the housing. The distal end of the pointer arm terminates in a point which is placed on a ground reference mark by an operator. The pointer arm 502 points in a direction normal to the first surface 504 of the tape measure housing 500.

FIG. 6 shows the tape housing 500 assembly with a second surface 602 having a slot 604 through which the measurement tape 214 is retractably extended. The Figure shows the distal end of the measurement tape with the hook 400 fixed thereto. The scale on the measurement tape 214 is scaled to indicate the distance between the distal end of the tap and the tip of the pointer 502. A compensated distance scale is imprinted on the face of the measurement tape 214. The distance scale is compensated so that when the tape measure 106 is fully retracted into the tape measure housing 500, the distance scale at the slot 604 indicates a distance equal to the combined lengths of the pointer arm 400, the length of the tape measure housing 500, and the end of the tape 214.

In operation, the compensated distance scale 412 allows the operator to measure the uncorrected slope height by hooking the hook 400 at the distal end of the measurement tape 214 to the wire hook 404 tape mounting hook 104 and then positioning the tip of the pointer arm 502 on the ground mark 208 of FIG. 2. The operator then reads the value of the uncorrected slope height directly from the compensated distance scale at the slot 604. Because the operations of pointing the tip 502 and reading from the scale on the measurement tape 214 are performed in close proximity to the ground reference mark, an operator is more comfortable and also less likely to make an erroneous measurement.

FIG. 7 shows the elements of a measuring tape assembly 210 according to the invention. The split housing 500 hold the retractable measurement tape 214 in a coil. The pointer 502 is fixed to one side of the housing with a coupling nut 700. The slot 604 is formed in an opposite side of the housing.

We claim:

1. A tape measuring system for measuring the uncorrected slope height of a GPS receiver with respect to a reference point below a GPS receiver having a phase center, comprising:

a tape having a distal end with a hook member fixed thereto;

a housing having an opening on a first surface through which a portion of the tape extends with the remainder of the tape being coiled therein;

a tape mounting hook, secured to the GPS receiver, for securing the distal end of the tape at a predetermined position with respect to the phase center of the GPS receiver, wherein said tape mounting hook comprises a wire with a raised portion and wherein said hook member on the distal end of the tape measure includes a slot of length and width compatible for engagement with said raised portion of said wire, a pointer affixed to the housing and extending in a direction opposite from the tape; and a calibrated distance scale on the tape which compensates for the length of the housing, the length of the pointer, and the length of extended tape and which displays the value of the uncorrected slope height of the GPS receiver with respect to the reference point when an operator extends the tape from the mounting hook and positions the pointer at the reference point.

2. The system of claim 1 wherein said pointer is aligned with the measuring tape extending from the opening in the housing.

3. A method for measuring the uncorrected slope height of a GPS receiver with respect to a reference point located below the GPS receiver with integral antenna, comprising the steps of:

securing a distal end of a tape measure to a tape mounting hook which is located on the GPS receiver in a predetermined position with respect to the phase center of the GPS receiver wherein said tape mounting hook includes a wire with a raised portion and wherein said hook member at the distal end of the tape measure includes a slot of length and width compatible with said raised portion of said wire;

extending the tape from the predetermined position toward the ground reference point by uncoiling the tape from within a housing which has a pointer located thereon opposite the extended tape;

positioning the pointer at the reference point; and reading a distance scale imprinted on the tape where the scale is calibrated to compensate for the length of the pointer, the length of the housing, and the length of extended tape so that the distance scale displays a value for the uncorrected slope height when an operator extends the tape from the mounting hook and positions the pointer at the ground reference point.

* * * * *